Figure 1:
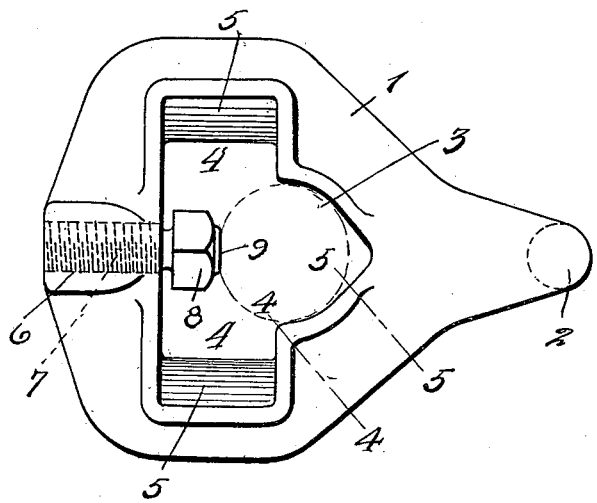

B. HASKELL.
LATHE DOG.
APPLICATION FILED AUG. 12, 1912.

1,087,369.

Patented Feb. 17, 1914.

2 SHEETS—SHEET 1.

Witnesses
J. Milton Jester
C. A. Mason

Inventor
Broderick Haskell
By W. Schonborn
Attorney

B. HASKELL.
LATHE DOG.
APPLICATION FILED AUG. 12, 1912.

1,087,369.

Patented Feb. 17, 1914.
2 SHEETS—SHEET 2.

Witnesses
J. Milton Jester
C. J. Mason

Inventor
Broderick Haskell,
By W. T. Schivenborn
Attorney

UNITED STATES PATENT OFFICE.

BRODERICK HASKELL, OF FRANKLIN, PENNSYLVANIA.

LATHE-DOG.

1,087,369. Specification of Letters Patent. Patented Feb. 17, 1914.

Application filed August 12, 1912. Serial No. 714,635.

*To all whom it may concern:*

Be it known that I, BRODERICK HASKELL, a citizen of the United States, residing at Franklin, in the county of Venango and State of Pennsylvania, have invented certain new and useful Improvements in Lathe-Dogs, of which the following is a specification.

Figure 2:
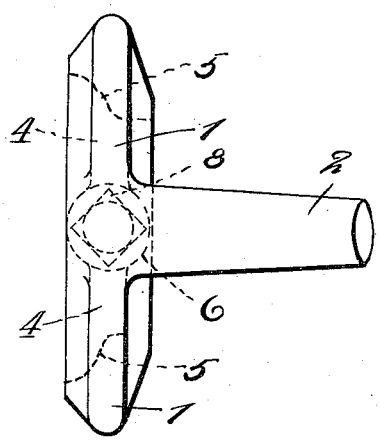
Figure 3:
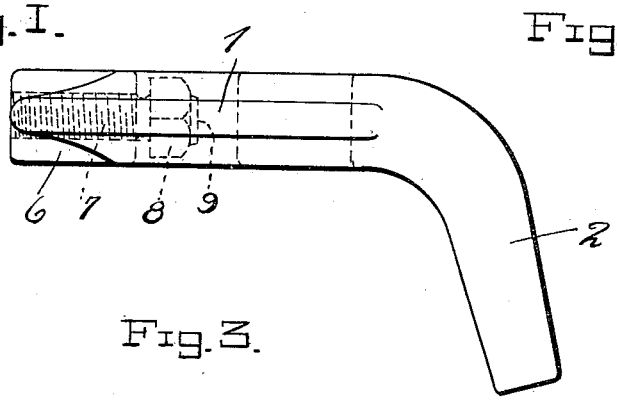
Figure 4:
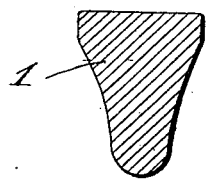
Figure 6:
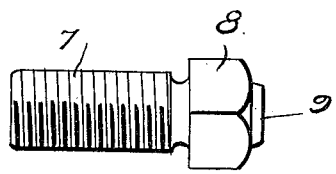
Figure 5:
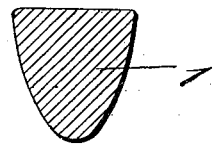
Figure 7:
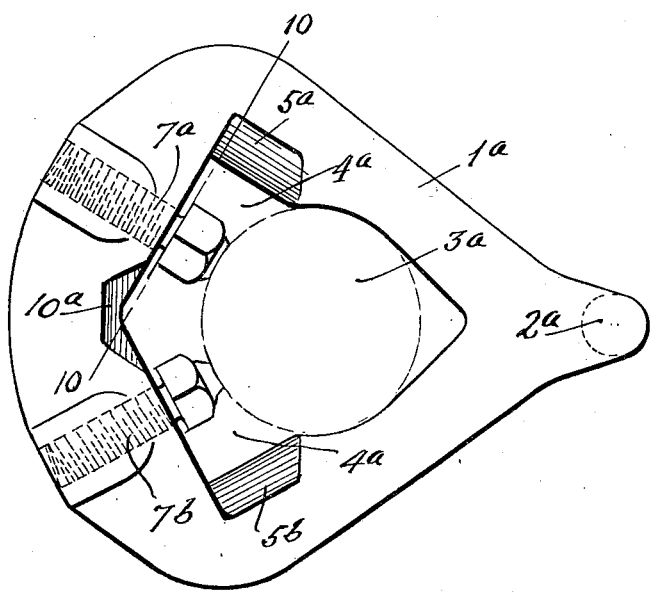
Figure 8:
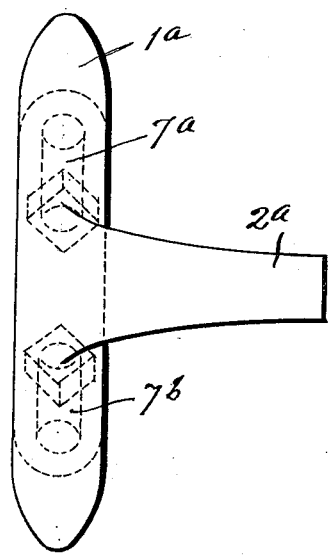
Figure 9:
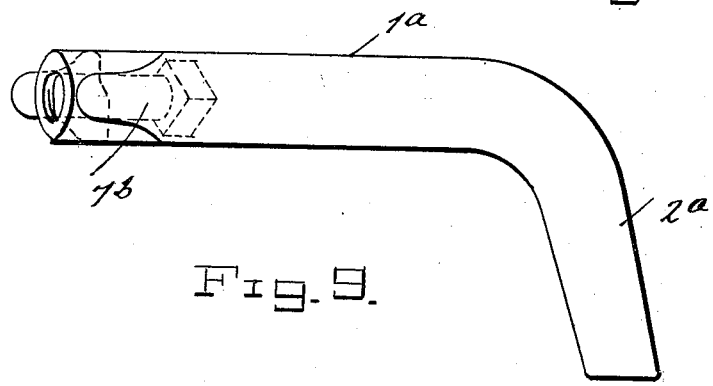
Figure 10:
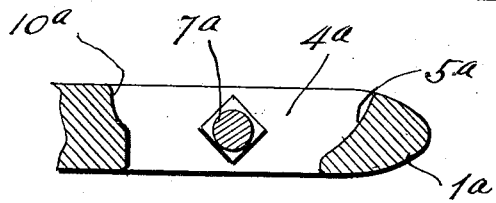

My invention relates to lathe dogs, and the objects of the invention are: First. To provide a lathe dog which has no projecting parts to catch the sleeves or clothing of the workmen. Second. To provide a lathe dog with an opening to receive the work, of such shape as will allow the clamping screw to be reversed from the ordinary practice and be inserted and removed from inside of said opening, and at the same time permit the head of the screw to be operated upon from inside of the opening. Third. To provide a lathe dog with openings provided with sides so constructed and beveled as to allow the use of a standard wrench on the head of the set screw.
Fourth. To construct a lathe dog in which the head of the set screw comes in contact with the work instead of the thread end and does not require any special form of wrench to adjust the set screw.
The invention consists of structural features and relative arrangements of the elements which will be hereinafter more fully described and particularly pointed out in the appended claims.
In the drawings in which similar reference characters indicate the same parts in the several views:

Figure 1 is an elevation of the improved lathe dog; Fig. 2 is an end view of Fig. 1;
Fig. 3 is a side view; Fig. 4 is a section on line 4—4 of Fig. 1; Fig. 5 is a section on line 5—5 of Fig. 1; Fig. 6 is a detail view of the set screw; Fig. 7 is an elevation of a modified form showing the use of two set screws; Fig. 8 is an end view of Fig. 7; Fig. 9 is a side view; and Fig. 10 is a section on line 10—10 of Fig. 7.

Referring to Figs. 1 to 6 inclusive, the numeral 1 indicates the body of the dog which may be provided with a straight or bent tail 2, said body portion having an opening 3 to receive the work. The opening 3 has two extensions 4, 4, which are beveled at their ends 5, 5, as shown in Fig. 2, for purposes to be hereinafter described.

6 is a screw threaded opening adapted to receive from the inner side the set screw 7 having a head 8 and small projection 9 to engage the work, as shown in Fig. 1. By reference to Fig. 1 it will be seen that when the work is removed from the dog, the arrangement of the opening 3 with respect to the threaded opening 6 is such that the set screw 7 can be readily and easily screwed from the inside into the opening 6, and the lateral extensions 4, 4, with beveled ends 5, 5, permit any standard wrench to engage the head 8, and allow sufficient movement of the handle and jaws of the wrench to quickly and effectively set the projection 9, against the work and securely lock the same and dog together.

In Figs. 7 to 10 inclusive, the same invention is carried out, with the exception that the body $1^a$ is changed in form to adapt the same to the use of two set screws $7^a$, $7^b$, of the same form as above described. The body $1^a$ is provided with the usual tail $2^a$ and also has the opening $3^a$, with lateral extensions $4^a$, $4^b$, having beveled ends $5^a$, $5^b$. The extensions $4^a$, $4^b$, instead of being in line as shown in Fig. 1, are at an angle, as shown in Fig. 7, and a cut out section $10^a$ is provided to permit the jaws of the wrench when applied to the heads of the set screws to have proper rotation for clamping the work in the dog.

From the foregoing disclosure it will be clearly seen that a dog constructed as shown avoids the upsetting or enlarging of the thread end of the set screws, which occurs in other designs where the thread end screw is constantly forced against the work, making it difficult to remove the same without injuring the thread in the body of the dog. Furthermore by having the head of the screw next to the work, it reduces to a minimum the torsional strain on the screw, thus enabling one to apply a greater pressure through the screw to the work and avoiding the danger of twisting off the head of the screw, which occurs when the wrench is applied to the opposite end in designs now in use. It will also be seen that the greater the diameter of the article to be held, the larger will be the amount of set screw in engagement with the threads in the body of the dog, while in lathe dogs with head reversed from that of the present invention, the larger the piece of work to be held, the more the set screw will project from the body of the dog, and the less strain it will resist. Also by the form of construction of the present invention, a greater pressure can be applied than in any other form, for the reason there is no portion of thread between the head of the screw and the article to be clamped in the dog, and no special form of wrench is required to engage the screw.

While I have shown the threads engaged by the set screws passing entirely through the body of the dog, this is not necessary, and if so desired the outer end of the threaded opening can be closed, as nothing is inserted in said opening from the outside.

From the foregoing disclosure it will be seen that a lathe dog made according to the present invention can be quickly and cheaply manufactured, and most efficiently carry out the advantages, objects and functions recited in the statement of invention.

What I claim is:—

1. A lathe dog comprising a body having a work opening provided with two oppositely arranged extensions, and a screw thread in said body, a set screw adapted to engage said thread through the work opening, the head of the set screw being in the work opening and between and adjacent the two extensions of the opening.

2. A lathe dog comprising a body having a work opening provided with two oppositely arranged lateral extensions having their ends beveled, and a screw thread in said body, a set screw adapted to engage said thread through the work opening, the head of the set screw being in the work opening and between and adjacent the two lateral extensions of the opening.

3. A lathe dog comprising a body having a work opening provided with two oppositely arranged lateral extensions and a central extension between said lateral extensions, and two screw threads in said body, a set screw adapted to engage each of said threads through the work opening, the heads of the set screws being in the work opening and arranged one on each side of said central extension and between and adjacent the two lateral extensions of the opening.

In testimony whereof I affix my signature in presence of two witnesses.

BRODERICK HASKELL.

Witnesses:
CLYDE M. MILLER,
WM. GRAMLEY.

---

Copies of this patent may be obtained for five cents each, by addressing the "Commissioner of Patents, Washington, D. C."